(12) United States Patent
Gayde et al.

(10) Patent No.: US 8,111,818 B2
(45) Date of Patent: Feb. 7, 2012

(54) METHOD AND SYSTEM FOR PROCESSING CALLS BY PROXY

(75) Inventors: Ruth Schaefer Gayde, Naperville, IL (US); Todd Cartwright Morgan, Oak Park, IL (US); John Richard Rosenberg, Elmhurst, IL (US)

(73) Assignee: Alcatel Lucent, Paris (FR)

( * ) Notice: Subject to any disclaimer, the term of this patent is extended or adjusted under 35 U.S.C. 154(b) by 1447 days.

(21) Appl. No.: 11/614,274

(22) Filed: Dec. 21, 2006

(65) Prior Publication Data
US 2008/0152112 A1    Jun. 26, 2008

(51) Int. Cl.
*H04M 3/42* (2006.01)
*H04M 7/00* (2006.01)
*H04M 11/04* (2006.01)

(52) U.S. Cl. ............... 379/201.01; 379/45; 379/219

(58) Field of Classification Search ............. 379/45, 379/201.01, 219, 220.01
See application file for complete search history.

(56) References Cited

U.S. PATENT DOCUMENTS

| 7,440,455 B2* | 10/2008 | Malas et al. ............... 370/389 |
| 7,844,034 B1* | 11/2010 | Oh et al. ................... 379/45 |
| 2007/0003024 A1* | 1/2007 | Olivier et al. .............. 379/45 |

* cited by examiner

*Primary Examiner* — Harry Hong
(74) *Attorney, Agent, or Firm* — Fay Sharpe LLP

(57) ABSTRACT

A method of processing a call by proxy in a network is provided. The method comprises: receiving a request from a first party for a proxy call on behalf of a second party at a first call control entity, whether or not an active call exists between the first and second parties; signaling the proxy call through the network; and establishing the proxy call to an appropriate destination, such as an emergency call center near the second party.

20 Claims, 6 Drawing Sheets

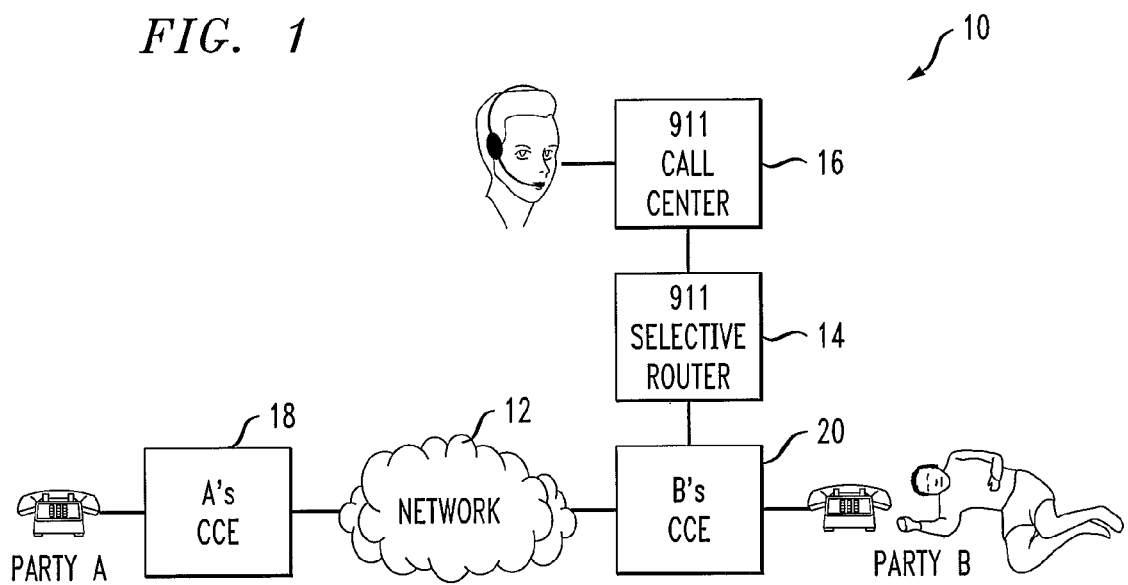
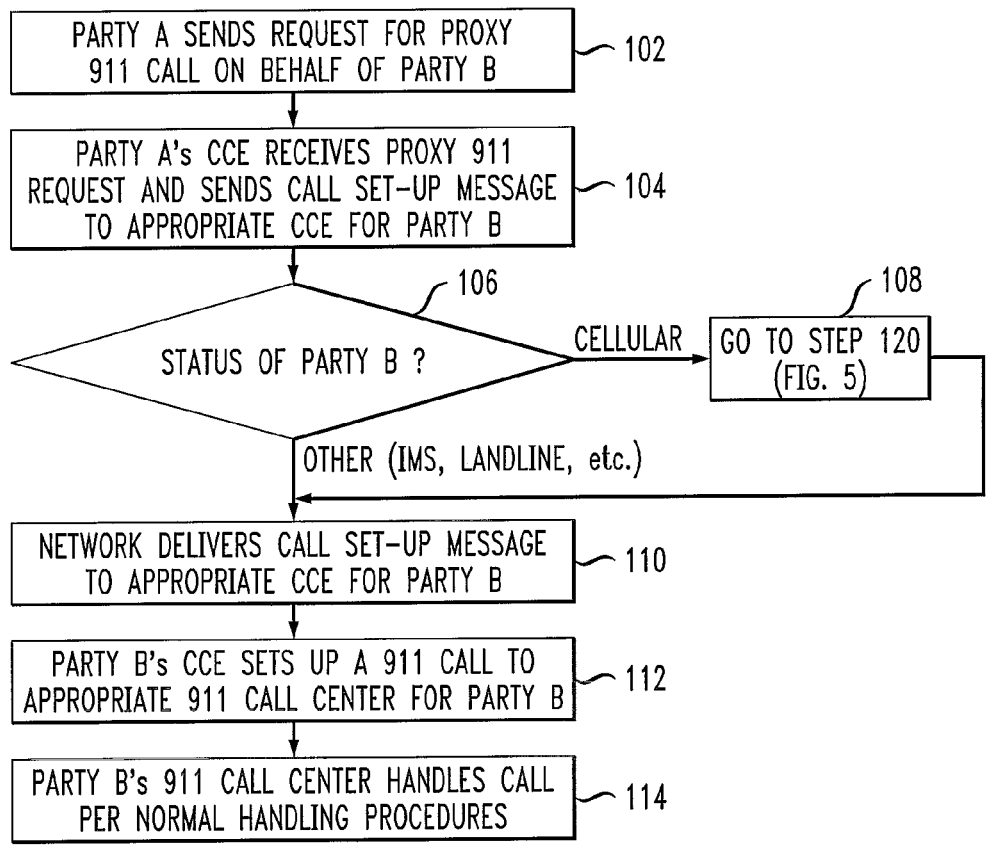

NO ACTIVE CALL FROM A TO B

ACTIVE CALL FROM A TO B,
BRIDGING AT B's CCE

CALL SCREENING FOR
PROXY-911 CALLS

METHOD AND SYSTEM FOR PROCESSING CALLS BY PROXY

BACKGROUND OF THE INVENTION

This invention relates to a method and system for processing calls by proxy, and, more particularly, for processing emergency calls by proxy. While the invention is particularly directed to the art of telecommunications, and will be thus described with specific reference thereto, it will be appreciated that the invention may have usefulness in other fields and applications.

By way of background, many countries have developed special dialing codes for making emergency calls. For example, "911" is the official national emergency number in the United States and Canada. Dialing 911 quickly connects the caller to a Public Safety Answering Point (PSAP) dispatcher trained to route the call to local emergency medical, fire, and law enforcement agencies. Most 911 systems now automatically report the telephone number and location of 911 calls made from landline phones, a capability called Enhanced 911 or E911. The FCC has also established a program requiring wireless telephone carriers to provide E911 capability. When fully implemented, wireless E911 will provide the precise location of 911 calls from wireless phones.

However, the current 911 system does not generally allow for calls by proxy. For instance, let us assume that Party A is talking to Party B, an elderly grandparent living far away. During the conversation, B falls down and cannot get up. It would not be easy for A to call the 911 emergency service associated with B's telephone number, without knowing something about B's local public safety answering point (PSAP).

Mobile Extension/DN Extension capabilities provided by Feature Server 5000 (FS5K) from Alcatel-Lucent provide a generalized mechanism to a mobile user whose mobile DN is kept private to receive Service from a "desk DN" served by the FS5K. The Desk DN serves as the user's public identity, and all calls placed by the mobile appear to have originated from the public Desk DN, and are in fact relayed through the serving FS 5000. This essentially lets the (private) mobile DN (A) assume the (public) Desk DN identity (B). Note, though, that there is a provisioned data relationship between the desk DN and the Mobile DN. Also, the "A assuming B's identity" treatment is explicitly not applied to emergency calls, so that if a circuit mobile extension phone dials 911, it is treated strictly as a cellular 911 call (A cannot pretend to be dialing 911 from B's desk).

Additionally, burglar alarm companies such as ADT allow a third party to call emergency services on behalf of a served client, when the burglar alarm reports an intruder to their Monitoring Center.

In regard to burglar alarm companies like ADT, those systems work by having the Monitoring Center contact the appropriate emergency authority, but not by calling 911. When an emergency occurs, the Monitoring Center will use a direct-dial number associated with the served client in a pre-existing database. Thus, there is a pre-existing prepared-for-emergencies relationship between the served party and the party calling the emergency authorities.

Thus, there is a need for a new and improved apparatus that completes a call to the appropriate 911 call center for B, regardless of whether the original call from A to B is still active or if the call was cut off when B fell down. Such a service would allow A—who has motivation and potentially detailed knowledge relating to B—to help by contacting and talking to an appropriate emergency operator. This can be of particular value if B is unable to do so.

The present invention assumes no prior association between Party A and Party B. In the Mobile Extension case, the Mobile DN and the Desk DN "belong" to the same user. In contrast, the present invention allows one to place a call, such as an emergency call, by proxy on behalf of someone who cannot do so. The present invention specifically identifies both parties of the Proxy 911 call.

SUMMARY OF THE INVENTION

Methods and systems for making calls by proxy are provided.

In accordance with an aspect of the present invention, a method of processing a call by proxy in a network is provided. The method comprises: receiving a request from a first party for a proxy call on behalf of a second party at a first call control entity, wherein there is no active call between the first and second parties; preparing a first message to be sent to a second call control entity, wherein the first message includes call set-up information and a proxy call indicator; delivering the first message to the second call control entity; and establishing a proxy call with the appropriate call destination on behalf of the second party.

In accordance with another aspect of the present invention, a method of processing a call by proxy in a network is provided. The method comprises: receiving a request from a first party for a proxy call on behalf of a second party at a first call control entity, wherein the first party and the second party maintain their call; delivering the request to a second call control entity, wherein the request includes a proxy call indicator; determining the appropriate call destination for the second party; and establishing a bridged connection at one of the call control entities to join the call between the first and second parties with the appropriate call destination on behalf of the second party.

In accordance with yet another aspect of the present invention, a system for processing a call by proxy in a network is provided. The system comprises: means for receiving a request from a first party for a proxy call on behalf of a second party at a first call control entity, wherein there is no active call between the first and second parties; means for preparing a first message to be sent to a second call control entity, wherein the first message includes call set-up information and a proxy call indicator; means for delivering the first message to the second call control entity; and means for establishing a proxy call with an appropriate call destination on behalf of the second party.

In accordance with yet another aspect of the present invention, a system for processing a call by proxy in a network is provided. The system comprises: means for receiving a request from a first party for a proxy call on behalf of a second party at a first call control entity, wherein the first party and the second party maintain their call; means for delivering the request to a second call control entity, wherein the request includes a proxy call indicator; means for determining an appropriate call destination for the proxy call; and means for establishing a bridged connection at one of the call control entities to join the call between the first and second parties with the appropriate call destination on behalf of the second party.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 1 is a simplified block diagram illustrating a network architecture suitable for implementing aspects of the present invention;

FIG. 2 is a flow chart outlining an embodiment of the invention in which there is no active call between A and B;

DETAILED DESCRIPTION

Figure 3:
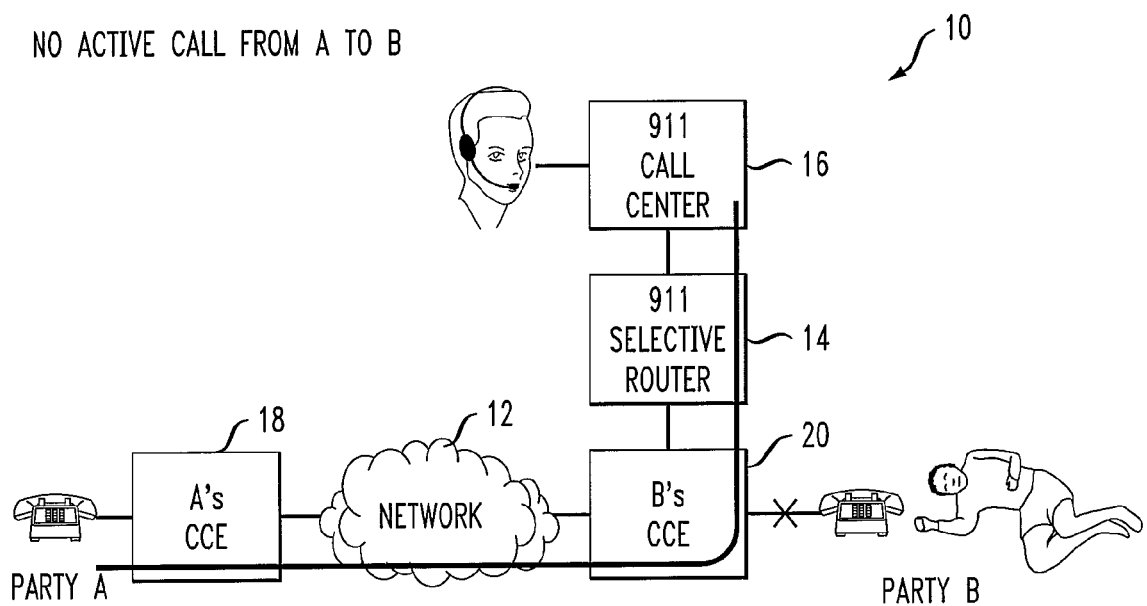
FIG. 3 is a simplified block diagram illustrating a wireless network suitable for implementing aspects of the present invention.

The exemplary embodiments disclosed herein are described with particular attention to the processing of emergency calls by proxy. However, it is to be understood that the embodiments disclosed herein may be applied to other types of proxy calls. Further, as used herein, a "proxy call" may be defined as a call initiated by a proxy to some destination on behalf of another party, whereby both the proxy and the other party's identities are passed to the destination (so the destination can understand the proxy is a "helper" of the other party).

Referring now to the drawings wherein the showings are for purposes of illustrating the exemplary embodiments only and not for purposes of limiting the claimed subject matter, FIG. 1 provides a view of a system 10 into which the presently described embodiments may be incorporated. The elements of the system 10 include at least two calling parties, in this case, Party A and Party B, a network 12, a selective router 14, an appropriate call destination such as an emergency/911 call center or PSAP 16, and at least one call control entity (CCE) (18 and 20) for each party.

Party A and Party B can be any of landline, cellular or IMS (IP Multimedia Subsystem) users.

The network 12 comprises any number of network entities between Parties A and B, and it can include any combination of well known PSTN elements as well as cellular or IMS elements.

The selective router 14, a typical network element in the emergency network, aggregates 911 calls from multiple end offices and provides the E911 function of determining the correct PSAP to which to route the call based on the identity (ANI or CPN) of the party with the emergency.

The 911 call center or PSAP 16 serves the residents of a certain geographic region. The 911 call center 16 dispatches emergency services for police, fire, medical, sheriff, search and rescue, and quick response teams as needed. Dispatchers may also relay requests for hospital helicopters to respond to various incidents.

The call control entities 18, 20 are used to initiate, terminate and transit call actions. The call control entities enable the establishment, release, modification and maintenance of individual calls or sets of calls. Many call control entities may be involved in a single call. The call control entities that are involved in the same call communicate with each other, using a predetermined protocol, to control and maintain the connections associated with the call. Typically, call control entities that are not involved in the same call do not communicate with each other in connection-oriented networks.

Two basic call scenarios are described below. In one case, the call between Party A and Party B is disconnected when B falls down or is otherwise unable to continue the call. The first embodiment is used for delivering the Proxy 911 (or P-911) call to the appropriate PSAP for this scenario. In another case, the call between Party A and Party B remains connected when B falls down or is otherwise unable to continue the call. The second and third embodiments may be used for delivering the Proxy 911 call to the appropriate PSAP for the second scenario.

We begin with the first scenario. That is, the two parties, A and B, are talking and B suddenly falls down, and the call between A and B is disconnected. A flow chart showing the steps involved with processing a Proxy 911 call in the first scenario is shown in FIG. 2. Thus, initially, A determines that the call is no longer connected, because, for example, A hears a dial tone. Accordingly, A must signal to the network that a Proxy 911 call is desired (102). Because there is no longer an active call between A and B, A needs to provide B's directory number (DN) to the network along with the Proxy 911 feature request (or Proxy Indicator).

A's CCE 18 receives the Proxy 911 call request along with B's DN from A and sends a call setup message to the CCE for B (104). The setup message may include B's DN as well as the Proxy 911 indicator. The message could be an existing call setup message containing the new Proxy 911 indicator or a new call setup message.

The network 12 must deliver the Proxy 911 call setup message to the appropriate CCE for B. The appropriate CCE for B is based upon B's "status," i.e., whether B is landline, cellular, or IMS. B's status is determined by the nature of the termination entity, that is, whether the straightforward DN-based routing leads to a cellular switch or not (106). If B is a cellular party, then additional steps may be required, and these steps are discussed after this scenario and outlined in FIG. 5 (108). On the other hand, if B is a landline or an IMS party, then this is straightforward routing based on B's DN.

The network 12 then delivers the call set-up message to the appropriate CCE for B (110). Thus, B's CCE 20 receives the Proxy 911 call request from A's CCE 18 and begins to set up a 911 call to the appropriate 911 call center for B (112).

The 911 call center for B is determined by whatever prior art algorithm would be used to route a 911 call dialed directly by B. If B is landline, then this is static information in the routing tables. If B is IMS, then this information could be static for fixed endpoints, or it could be through a mechanism such as NENA's (National Emergency Number Association) i2 architecture for nomadic and mobile endpoints. If B is cellular, then this information is based on the appropriate cell site for B, as described more fully below (see FIG. 5). In this example, the appropriate 911 call center for B is the call center 16 as shown in FIG. 1.

Thus, B's CCE 20 sets up the proxy 911 call to the appropriate call center 16 based on B's status (cellular, IMS, landline) (112). The information provided to the 911 call center 16 includes B's calling party number, as known in the prior art for a 911 call dialed by B, plus the addition of a Proxy 911 indicator and A's directory number.

The call center 16 handles the call per normal handling procedures (114). The call center attendant will be provided with information about the location of B and also will be informed in some way that this is a Proxy 911 call, so that he or she will know that A may be the one doing the talking, not B with the actual emergency. It should be noted that one option would be for the emergency operator to attempt to place a 3-way call to B, in order to attempt to see if B can be reached.

FIG. 3 illustrates the call legs for the proxy 911 call in this embodiment.

Note that while the scenario described above assumes that A and B originally were talking and then were disconnected when B fell down, it is not necessary for A and B to be talking before the method described above can be used. For example, A and B could be using Instant Messaging and B could type something like "AAAHHH!" or "HEART ATTACK!"

When B is a cellular subscriber, then special consideration must be given to finding the right serving Mobile Switching Center handling B.

Figure 4:
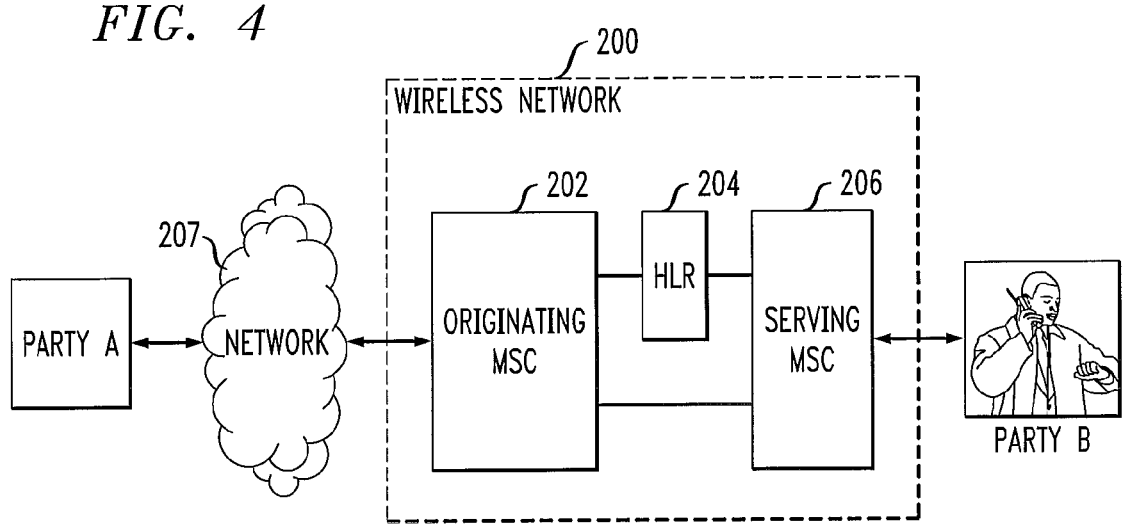
FIG. 4 illustrates the call legs formed when implementing the method outlined in FIG. 2.

FIG. 4 illustrates a wireless network 200 in an exemplary embodiment of the invention. The wireless network 200 includes an originating Mobile Switching Center (O-MSC) 202, a Home Location Register (HLR) 204, and a serving Mobile Switching Center (S-MSC) 206. arty A is connected to the wireless network 200 via a network 207. The O-MSC 202 handles the termination of calls into the wireless network 200. The HLR 204 performs functions for Party B. The S-MSC 206 serves Party B when Party B's mobile phone is powered on. The wireless network 200 may include other networks, systems, or devices not shown for the sake of brevity.

The O-MSC 202 handles all calls to Party B, obtaining the routing to B's current S-MSC. The assignment of Party B to a particular O-MSC is generally static. If Party A is using a landline phone, then the O-MSC 202 receives the call from Party A through a central office or some other gateway between the landline network and the wireless network 200.

As stated earlier, Party B is using a mobile phone in this example. Party A may be using any type of communication device, such as a mobile phone, a PDA, a laptop computer, a landline phone, etc.

Figure 5:
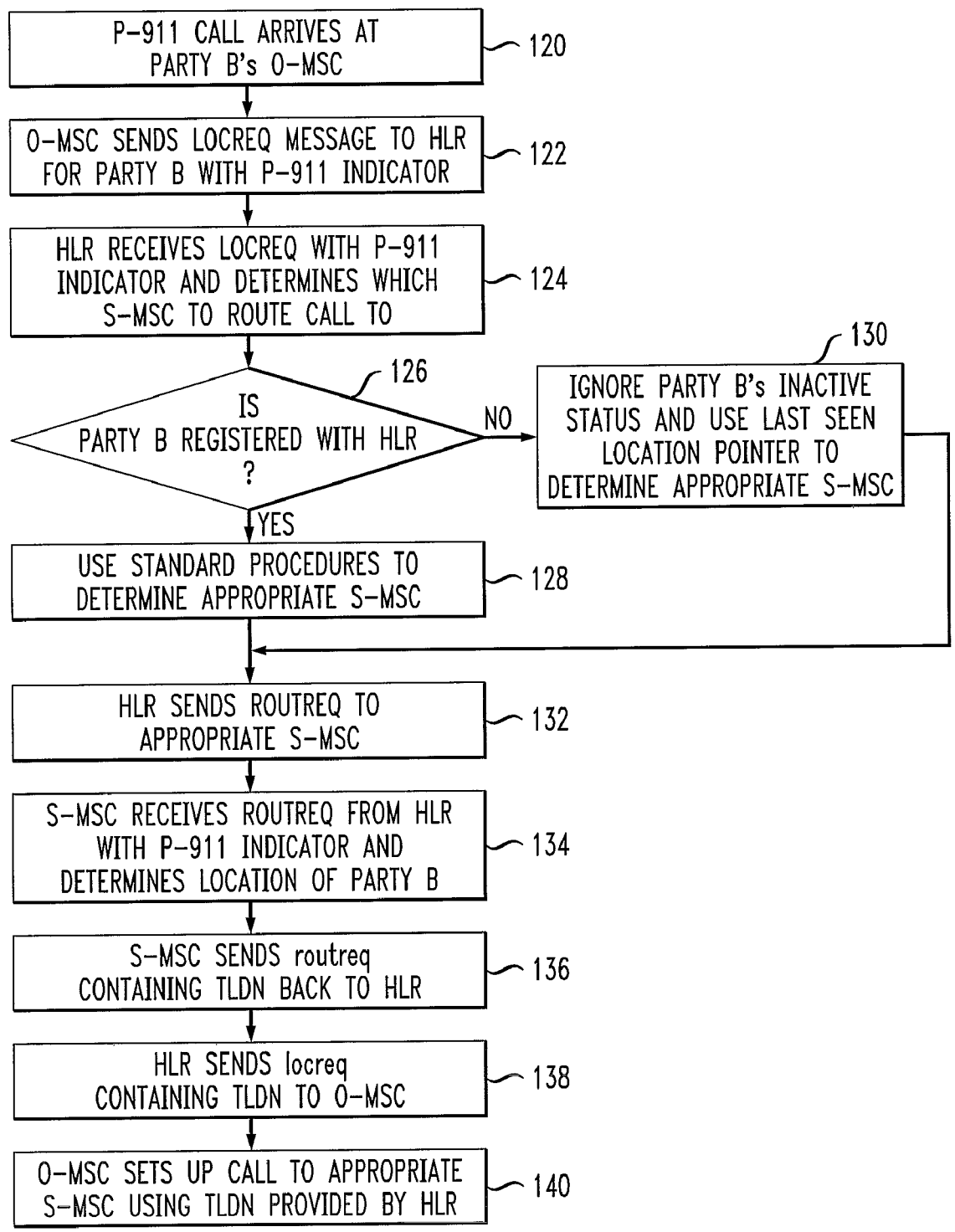
FIG. 5 is a flow chart outlining a method of handling a proxy 911 call when Party B is a wireless subscriber.

Turning now to FIG. 5, the following steps apply to the processing of Proxy 911 calls in ANSI-41 cellular networks and GSM/UMTS networks.

The proxy 911 call arrives at B's originating MSC (O-MSC) 202 (120). (In some networks, this may be called a home MSC or a gateway MSC.) The O-MSC 202 recognizes this is a Proxy 911 call for B, based on the information in the call setup message.

The O-MSC 202 sends a Location Request Invoke message (LOCREQ) to the HLR 204 for B, which message includes the Proxy 911 indicator (122). In GSM or UMTS networks, this would be a Send Routinginformation message.

The HLR 204 receives the LOCREQ with the P-911 indicator and determines which S-MSC to route this call to (124). The HLR 204 determines whether party B is registered with the HLR 204 (126).

If B is still registered with the HLR 204, then prior art procedures are used (128). It should also be noted that the P-911 indicator could be passed in the RoutingRequest (or ProvideRoamingNumber) message as a reinforcement to make sure that the S-MSC 206 receives this information. If some switch in the call path within the wireless network 200 did not support the ISUP signaling for P-911 applications, then the P-911 bit could be lost in the TLDN/MSRN call path. By passing the P-911 indicator also in the ANSI-41/GSM MAP signaling, it increases the likelihood that the S-MSC 206 receives this information. Then when it receives the corresponding TLDN/MSRN call, the S-MSC 206 already knows this is a P-911 call.

However, if B is not registered with the HLR 204, which may occur if the call leg at B is disconnected and the registration for B at this S-MSC has been cancelled due to powering down when B fell down, then the HLR 204 will ignore the B's inactive status and will use its Last Seen Location pointer for B (130). Thus, the HLR 204 determines the appropriate S-MSC for the unregistered mobile, because this is a P-911 call.

The HLR 204 then sends a RoutingRequest Invoke message (ROUTREQ) to the appropriate S-MSC determined above, which message includes the P-911 call indicator (132). In GSM/UMTS networks, this would be a ProvideRoamingNumber message.

The S-MSC 206 receives the ROUTREQ from the HLR 204 with the P-911 indicator and performs certain functions (134). For example, because the S-MSC 206 will need to know information about B's location to determine routing to the right 911 center, it needs to find out where B is (or was, when last seen).

The possible options include: (a) paging B to see if B is within radio contact, to determine the appropriate cell site for B; (b) consulting a database containing the last seen cell site for B; and (c) paging first, and if no response, then checking the database.

Additionally, the S-MSC allocates a TLDN (Temporary Local Directory Number) for this P-911 call to B. In GSM/UMTS networks, this would be a Mobile Station Roaming Number. Thus, a TLDN is allocated for a mobile who may not be registered or who does not answer a page.

The S-MSC 206 sends a RoutingRequest Return Result (routreq) containing the TLDN back to the HLR (136). The HLR 204 sends the Location Request Return Result (locreq) containing the TLDN to the O-MSC 202 (138).

The O-MSC 202 sets up the call to the S-MSC 206, using the TLDN provided above (140). The call setup message includes the TLDN and the P-911 indicator.

When the TLDN call arrives at the S-MSC 206, the S-MSC 206 will recognize this TLDN as being associated with a P-911 call and route the call to the appropriate call center, as if B had dialed 911, rather than attempting to deliver the call to B, as it would if following normal mobile termination processing.

In one embodiment, the S-MSC 206 maintains a dynamic database that is queryable in real-time to determine B's last seen location, e.g., cell sector or cell, regardless of whether or not B is currently on a call. The S-MSC 206 would then use that location information to perform the normal call routing function for a 911 call, ie., to find the call center nearest to B, in order to connect A to that call center.

Figure 6:
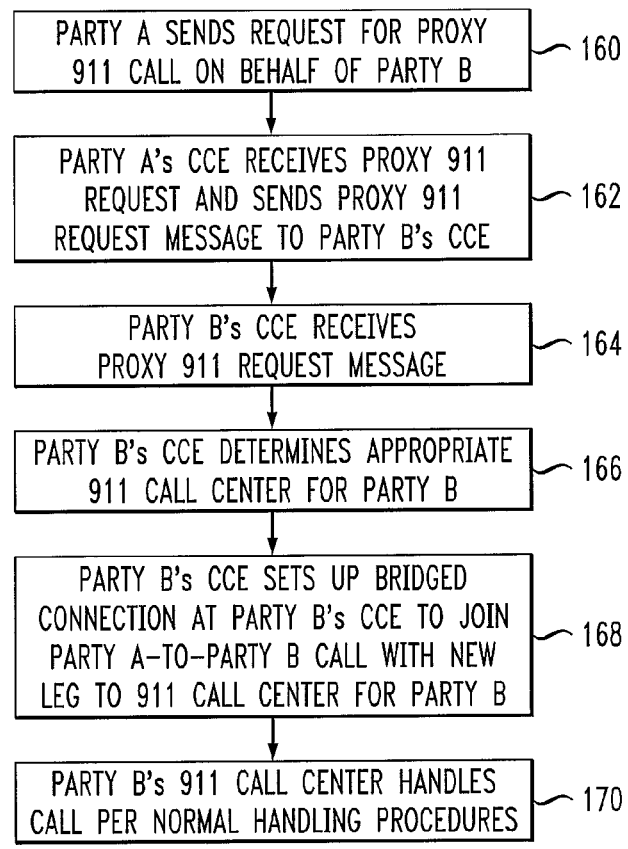
FIG. 6 is a flow chart outlining an embodiment of the invention in which there is an active call between A and B with bridging at B's CCE.

Turning now to another scenario, A and B are talking and B falls down, and the call between A and B remains connected. One solution involves bridging at B's CCE 20, as outlined in FIG. 6.

While A and B are talking, B falls down. Party A determines that the call is still connected, because he does not, for example, hear a dial tone or he still hears B's TV in the background. Thus, A signals to the network that he wants to make a Proxy 911 call (160). A may use a flash or flash-button equivalent and then dial a feature code that indicates a "Proxy 911 Call."

A's CCE 18,receives the Proxy 911 call request from A (162). A's CCE 18 determines that A is currently on a call with B and sends the Proxy 911 request message to B's CCE 20. This is done within the context of the existing call to B and without starting a new call from A to B. Thus, B's DN would not need to be included, since within this call context B's DN is already known. A is reconnected to this call automatically. That is, A does not have to flash again.

B's CCE 20 receives the Proxy 911 call request from A's CCE 16 (164). The 911 call center for B is determined by using whatever prior art algorithm would be used to route a 911 call dialed directly by B (166). If B is landline, this is static information in the routing tables. If B is cellular, this information is derived based on B's current location and/or the cell site currently handling B's call, as described earlier (see FIG. 5). If B is IMS, then this information could be static for fixed endpoints, or it could be through a mechanism such as NENA's (National Emergency Number Association) i2 architecture for nomadic and mobile endpoints.

Once the proper routing for the Proxy 911 call is determined, B's CCE 20 sets up a bridged connection (e.g., a 3-way call) at B's CCE 20 to join the A-to-B call with the new call leg to the 911 call center for B (168). The information provided to the 911 call center includes whatever prior art information is already provided, with the addition of a Proxy 911 indicator and A's phone number. The call legs are shown in FIG. 7.

B's 911 call center 16 handles the call per normal handling (170). The call center attendant will be provided with prior art information about the location of B, and also will be informed in some way that this is a Proxy 911 call, so that he or she will know that A may be the one doing the talking, not B with the actual emergency.

Figure 7:
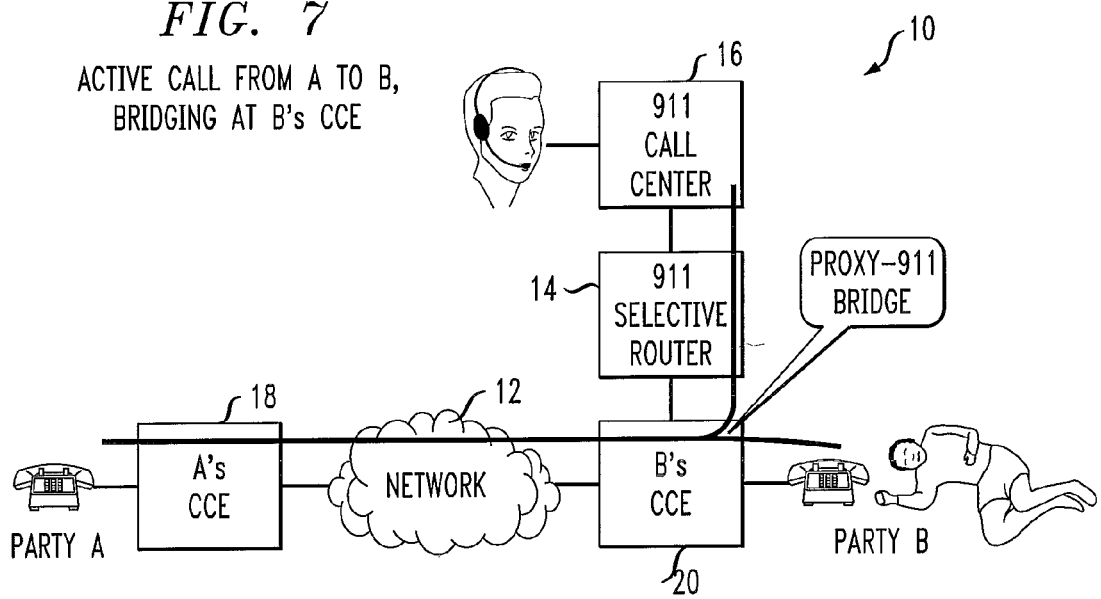
FIG. 7 illustrates the call legs formed when implementing the method outlined in FIG. 6.

Turning now to FIG. 7, we return to the second scenario. That is, A and B are talking and B falls down, and the call between A and B remains connected. However, in this embodiment, the bridging is at A's CCE 18.

Figure 8:
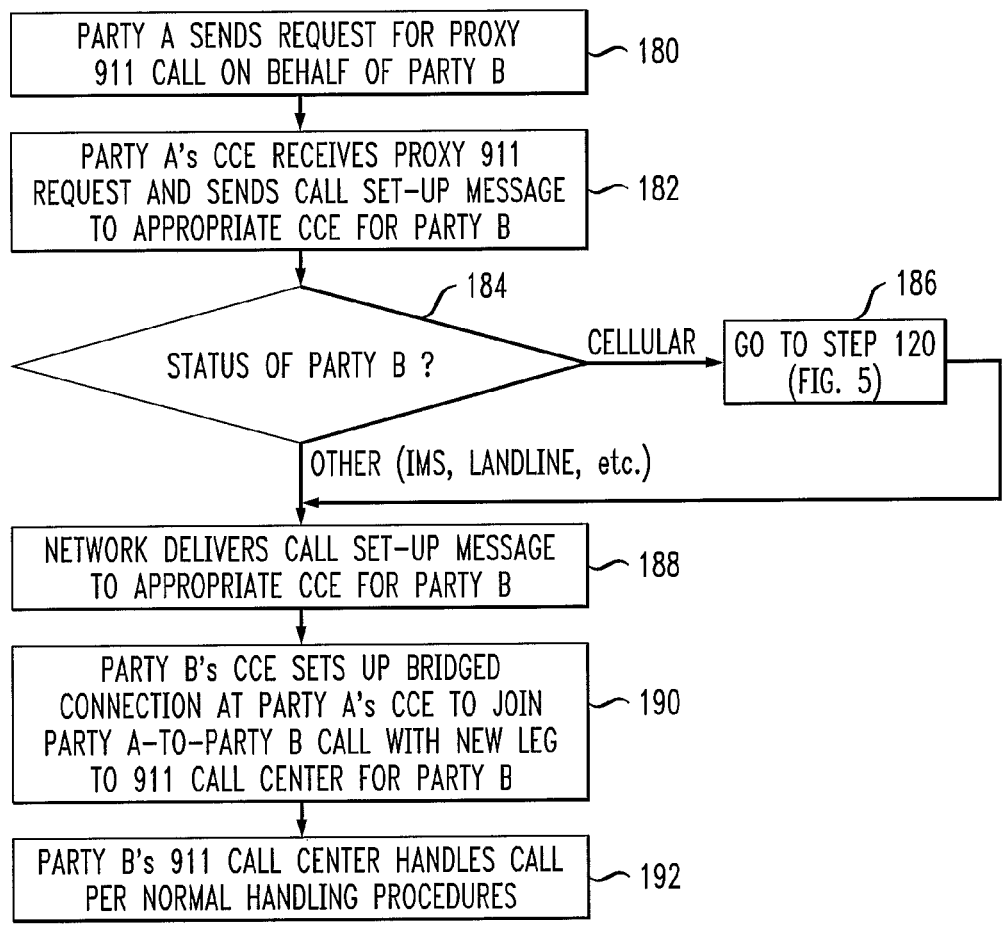
FIG. 8 is a flow chart outlining an alternative embodiment of the invention in which there is an active call between A and B with bridging at A's CCE.

A flow chart showing the steps involved with this scenario is shown in FIG. 8. While A and B are talking, B falls down. Party A determines that the call is still connected, because he does not, for example, hear a dial tone or he still hears B's TV in the background. So A signals to the network that he wants to make a Proxy 911 call (180). A may use a flash or flash-button equivalent and then dial a feature code that indicates "Proxy 911 Call."

In this method, the invocation of "Proxy 911" does not modify the operation of this multiway calling operation, and this added leg is treated as a separate Proxy-911 call toward B, despite the active call between A and B. Because of this, A needs to provide B's DN to the network along with the Proxy 911 feature request.

A's CCE 18 receives the Proxy 911 call request plus B's DN from A and sends a call setup message to the appropriate CCE for B (182). The call setup message will include B's DN as well as a Proxy 911 indicator. The message could be an existing call setup message containing the new Proxy 911 indicator, or a new call setup message.

The network must determine the appropriate CCE for B. Thus, a determination must be made as to the status of B (184). If B is a cellular party, then additional steps may be required (186) (see FIG. 5.) However, if B is a landline or IMS party, then this is straightforward routing based on B's DN. The network then delivers the call set-up message to B's CCE 20 (188).

B's CCE 20 receives the Proxy 911 call request from A's CCE 16 and sets up a bridged connection at A's CCE 18 to join the call with a new leg to the call center 16 (190). The appropriate 911 call center for B is determined by using whatever prior art algorithm would be used to route a 911 call dialed directly by B.

If B is landline, this is static information in the routing tables.

If B is cellular, this information is based on B's location and/or the appropriate cell site for B, as described above.

If B is IMS, then this information could be static for fixed endpoints, or it could be through a mechanism such as NENA's (National Emergency Number Association) i2 architecture for nomadic and mobile endpoints.

Figure 9:
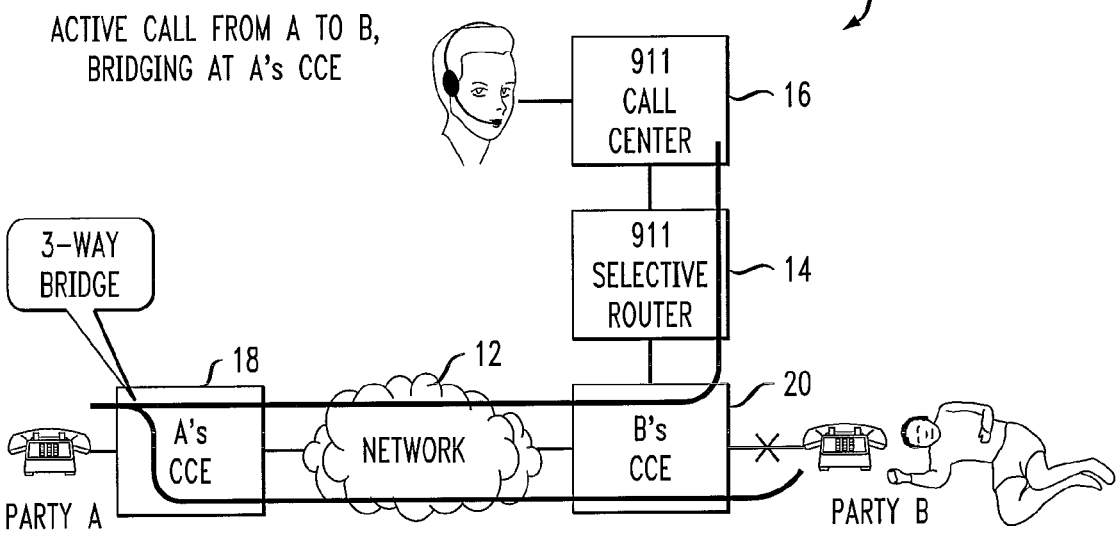
FIG. 9 illustrates the call legs formed when implementing the method outlined in FIG. 8.

The information provided to the 911 call center 16 includes B's calling party number in whatever manner the prior art would provide it for a 911 call dialed by B himself, plus the addition of a Proxy 911 indicator and A's phone number. The call leg is shown in FIG. 9.

B's 911 call center 16 handles the call per normal handling (192). The call center attendant will be provided with prior art information about the location of B, and also will be informed in some way that this is a Proxy 911 call, so that he or she will know that A may be the one doing the talking, not B with the actual emergency.

A is connected to a call-taker at the appropriate 911 call center for B. A can continue to converse with the call taker while keeping B on hold, or can flash or take other appropriate action consistent with A's multiway calling feature to bridge the two call legs so that A, B, and the call-taker are bridged together. Note that B can be any technology.

Figure 10:
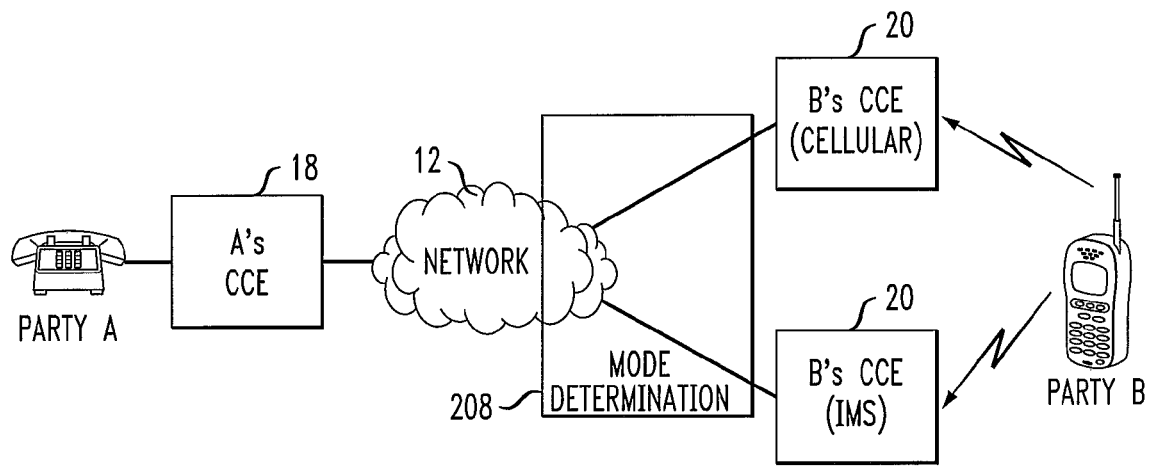
FIG. 10 illustrates mode determination in accordance with aspects of the present invention.

With dual mode service (e.g., when B's DN is associated with IMS and cellular service), the prior art includes some "Mode Determination" mechanisms to determine which mode to use for delivering an ordinary incoming call, for the case when B may have dual mode service and may actually be available in both domains simultaneously. As shown in FIG. 10, the present invention would enhance the prior art to allow incoming Proxy-911 calls to receive special consideration by a Mode Determination mechanism 200. For example, the algorithm may be that if B is registered in both domains, then the Proxy 911 call may be delivered always using the method designated in advance by the service provider (e.g., use cellular method because that has been more reliable).

Figure 11:
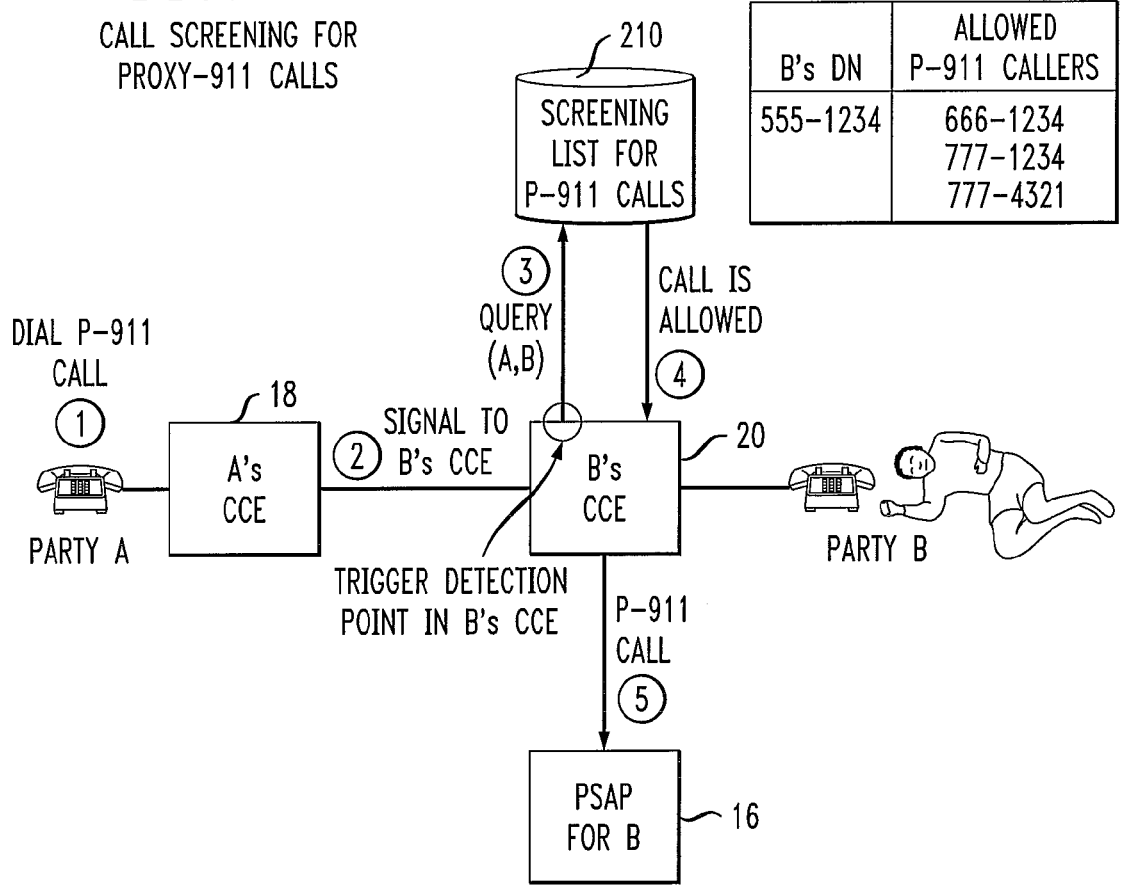
FIG. 11 illustrates call screening for proxy-911 calls in accordance with aspects of the present invention.

While the present invention allows any party to make a Proxy 911 call for any other party, an alternative would be to provide some screening of Proxy 911 calls for B (see FIG. 11). For example, Proxy 911 calls for B may be allowed only from a pre-determined list of B's friends and family. Thus, Party A dials a P-911 call on behalf of B. A's CCE 18 sends a signal to B's CCE 20. A query is sent to a database 202, which includes a screening list for P-911 calls. If A's DN is in the list, then the P-911 call is allowed. B's CCE 20 then processes the P-911 call and sets up a call with the 911 call center 16.

It is to be understood that the present invention is not limited to "911" because the number to dial for emergencies could consist of different digit strings, e.g., 119. Further, there may be separate numbers for different services, such as fire brigade or bomb squad. Therefore, present invention contemplates the possibility of different types of proxy calls. Suppose a local system is set up whereby a caller dials 119 for emergency, 112 for fire, and 113 for bomb squad. These might not all use the same specific 911 selective routing functions described above, but if one considers the "selective routing" function to be a generic kind of location-aware routing function, then it can be assumed that the signaling through the network may be able to accommodate different call types, i.e., more than just a single "proxy-911" call.

Furthermore, cellular switches typically store location-based number substitution data to support dialing conveniences, such as *HUT to reach the nearest Pizza Hut. Given the idea of multiple kinds of emergency-like proxy calls, it is not difficult to extend this concept to something such as Proxy *HUT. For example, maybe a wireless subscriber's teenaged daughter has a car breakdown and the cellphone battery is about to run down. So the subscriber tells his daughter to get off the phone (but leave it powered on as long as she can) because talk time quickly exhausts the battery life. At this point, from the subscriber's phone the subscriber dials Proxy *AAA to get the nearest road assistance for her. In essence, it is a kind of remote/proxy invocation of location-based services.

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A computer-implemented method of processing a call by proxy in a network, the method comprising:
    receiving a request from a first party for a proxy call on behalf of a second party at a first call control entity, wherein the first call control entity comprises a computer system and there is no active call between the first and second parties;
    preparing a first message to be sent to a second call control entity, wherein the second call control entity comprises a computer system and the first message includes call set-up information and a proxy call indicator;
    delivering the first message to the second call control entity; and
    establishing a proxy call with an appropriate call destination on behalf of the second party.

2. The method defined in claim 1, wherein the appropriate call destination is an emergency call center near the second party.

3. The method defined in claim 1, further comprising:
    where the second party is using a mobile phone, performing the following operations:
    receiving the first message at the originating mobile switching center (O-MSC) for the second party;
    sending a second message to a Home Location Register, wherein the second message includes the proxy call indicator;
    where the second party's mobile phone is not registered with the HLR, using the last seen pointer to determine an appropriate serving MSC (S-MSC) for the second party's mobile phone;
    sending a third message to the appropriate S-MSC for the second party's mobile phone, wherein the third message includes the proxy call indicator;
    receiving the third message at the S-MSC;
    determining the second party's location;

allocating a Temporary Local Directory Number (TLDN) or a Mobile Station Roaming Number (MSRN) for the proxy call;
forwarding the TLDN or the MSRN to the O-MSC; and
sending the first message to the S-MSC, wherein the first message includes the TLDN or the MSRN and the proxy call indicator.

4. The method defined in claim 1, wherein the network includes a proxy call screening mechanism.

5. A computer-implemented method of processing a call by proxy in a network, the method comprising:
receiving a request from a first party for a proxy call on behalf of a second party at a first call control entity, wherein the first call control entity comprises a computer system and the first party and the second party maintain their call;
delivering the request to a second call control entity, wherein the second call control entity comprises a computer system and the request includes a proxy call indicator;
determining an appropriate call destination for the proxy call; and
establishing a bridged connection at one of the call control entities to join the call between the first and second parties with the appropriate call destination on behalf of the second party.

6. The method defined in claim 5, wherein the appropriate destination is an emergency call center near the second party.

7. The method defined in claim 5, wherein the bridged connection is at the second call control entity.

8. The method defined in claim 5, wherein the bridged connection is at the first call control entity.

9. The method defined in claim 5, further comprising:
where the second party is using a mobile phone, performing the following operations:
receiving a first message at the originating mobile switching center (O-MSC) for the second party, wherein the first message includes a proxy call indicator;
sending a second message to a Home Location Register (HLR), wherein the second message includes a proxy call indicator;
sending a third message to the appropriate serving MSC (S-MSC) for the second party's mobile phone, wherein the third message includes a proxy call indicator;
receiving the third message at the S-MSC;
determining the second party's location;
allocating a Temporary Local Directory Number (TLDN) or a Mobile Station Roaming Number (MSRN) for the proxy call;
forwarding the TLDN or the MSRN to the O-MSC; and
sending the first message to the S-MSC, wherein the first message includes the TLDN or the MSRN and the proxy call indicator.

10. The method defined in claim 5, wherein the network includes a proxy call screening mechanism.

11. A system for processing a call by proxy in a network, the system comprising:
a first call control entity that receives a request from a first party for a proxy call on behalf of a second party, wherein there is no active call between the first and second parties,
prepares a first message to be sent to a second call control entity, wherein the first message includes call set-up information and a proxy call indicator,
and delivers the first message to the second call control entity; and
the second call control entity establishes a proxy call with an appropriate call destination on behalf of the second party.

12. The system defined in claim 11, wherein the appropriate destination is an emergency call center near the second party.

13. The system defined in claim 11, further comprising:
means for performing the following operations, where the second party is using a mobile phone:
means for receiving the first message at the originating mobile switching center (O-MSC) for the second party;
means for sending a second message to a Home Location Register (HLR), wherein the second message includes a proxy call indicator;
means for using the last seen pointer to determine an appropriate serving MSC (S-MSC) for the second party's mobile phone, where the second party's mobile phone is not registered with the HLR
means for sending a third message to the appropriate serving MSC (S-MSC) for the second party's mobile phone, wherein the third message includes a proxy call indicator;
means for receiving the third message at the S-MSC;
means for determining the second party's location;
means for allocating a Temporary Local Directory Number (TLDN) or a Mobile Station Roaming Number (MSRN) for the proxy call;
means for forwarding the TLDN or the MSRN to the O-MSC; and
means for sending the first message to the S-MSC, wherein the first message includes the TLDN or the MSRN and the proxy call indicator.

14. The system defined in claim 11, wherein the network includes a proxy call screening mechanism.

15. A system for processing a call by proxy in a network, the system comprising:
a first call control entity that receives a request from a first party for a proxy call on behalf of a second, wherein the first party and the second party maintain their call, and delivers
the request to a second call control entity, wherein the request includes a proxy call indicator; and the second call control entity determines
the appropriate call destination on behalf the second party, and establishes
a bridged connection at one of the call control entities to join the call between the first and second parties with the appropriate call destination on behalf of the second party.

16. The system defined in claim 15, wherein the appropriate destination is an emergency call center near the second party.

17. The system defined in claim 15, wherein the bridged connection is at the second call control entity.

18. The system defined in claim 15, wherein the bridged connection is at the first call control entity.

19. The system defined in claim 15, further comprising:
means for performing the following operations where the second party is using a mobile phone,:
means for receiving a first message at the originating mobile switching center (O-MSC) for the second party, wherein the first message includes call set-up information and a proxy call indicator;
means for sending a second message to a Home Location Register (HLR), wherein the second message includes the proxy call indicator;

means for sending a third message to the appropriate serving MSC (S-MSC) for the second party's mobile phone, wherein the third message includes a proxy call indicator;

means for receiving the third message at the S-MSC;

means for determining the second party's location;

means for allocating a Temporary Local Directory Number (TLDN) or a Mobile Station Roaming Number (MSRN) for the proxy call;

means for forwarding the TLDN or the MSRN to the O-MSC; and means for sending the first message to the S-MSC, wherein the call set-up message includes the TLDN or the MSRN and the proxy call indicator.

20. The system defined in claim 15, wherein the network includes a proxy call screening mechanism.

* * * * *